United States Patent
Shaw et al.

(10) Patent No.: US 12,007,945 B2
(45) Date of Patent: Jun. 11, 2024

(54) SNAPSHOT MIGRATION BETWEEN CLOUD STORAGE PLATFORMS

(71) Applicant: Dell Products L.P., Round Rock, TX (US)

(72) Inventors: Rabi Shankar Shaw, Bangalore (IN); Rituraj Kumar, Bangalore (IN); Priyamrita Ghosh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/970,654

(22) Filed: Oct. 21, 2022

(65) Prior Publication Data

US 2024/0134822 A1 Apr. 25, 2024

(51) Int. Cl.
*G06F 16/00* (2019.01)
*G06F 16/11* (2019.01)
*G06F 16/182* (2019.01)

(52) U.S. Cl.
CPC .......... *G06F 16/128* (2019.01); *G06F 16/119* (2019.01); *G06F 16/1824* (2019.01)

(58) Field of Classification Search
None
See application file for complete search history.

(56) References Cited

U.S. PATENT DOCUMENTS

2018/0196832 A1* 7/2018 Maybee ............... H04L 9/0637

FOREIGN PATENT DOCUMENTS

WO WO-2021202175 A1 * 10/2021 ............. G06F 16/13

OTHER PUBLICATIONS

Huawei Enterprise, "Functions of a Consistency Group," OceanStor Dorado 6.0.1 HyperReplication FeatureGuide, https://support.huawei.com/enterprise/en/doc/EDOC1100135781/e2c9f9fa/functions-of-a-consistency-group, Accessed Sep. 23, 2022, 3 pages.
Drupal, "Delta Overview—A Snapshot is Worth a Hundred Hours," https://www.drupal.org/node/1341788, Accessed Sep. 23, 2022, 3 pages.
R. Sheldon et al., "Storage Volume," https://www.techtarget.com/searchstorage/definition/volume Accessed Oct. 12, 2022, 5 pages.

* cited by examiner

*Primary Examiner* — Tuankhanh D Phan
(74) *Attorney, Agent, or Firm* — Ryan, Mason & Lewis, LLP

(57) ABSTRACT

A method comprises receiving an input requesting migration of one or more snapshots of a logical storage volume from a first cloud storage platform to a second cloud storage platform, and retrieving one or more first objects corresponding to the one or more snapshots from the first cloud storage platform. The one or more first objects are stored in a cache, and contents of the one or more first objects are sent to the second cloud storage platform for storage as one or more second objects.

20 Claims, 13 Drawing Sheets

| id | snap_id | base_id | parent_id | dest_type | dest_id | archived_time | status | transaction | details |
|---|---|---|---|---|---|---|---|---|---|
| 1 | 1 |  |  | 4 | 1 | 2022-10-11 16:14:35.030854 | ready |  | [{"snapSize": 1073741824, "snapDiffSize": 10952704}] |
| 2 | 2 | 1 |  | 4 | 1 | 2022-10-11 16:22:40.548069 | ready |  | [{"snapSize": 1073741824, "snapDiffSize": 139264}] |

| id | asnap_id | destination | metadata | size_data | size_metadata | archived_time |
|---|---|---|---|---|---|---|
| 1 | 1 | first_dest/sv_2/BASE:80436:D1 | first_dest/sv_2/BASE:80436:M1 | 10952704 | 2881 | 2022-10-11 16:14:35.062608 |
| 2 | 2 | first_dest/sv_2/80436:80437:D1 | first_dest/sv_2/80436:80437:M1 | 139264 | 405 | 2022-10-11 16:22:40.598039 |

| id | metainfo |
|---|---|
| 1 | [{"date": "2022-10-11T10:44:26+0000", "snap": {"cur": "80436", "base": null}, "server": "unityblk", "version": "1.0", "resource": "sv_2", "encryption": []}] |
| 2 | [{"date": "2022-10-11T10:52:33+0000", "snap": {"cur": "80437", "base": "80436"}, "server": "unityblk", "version": "1.0", "resource": "sv_2", "encryption": []}] |

| id | snap_id | base_id | parent_id | dest_type | dest_id | archived_time | status | transaction | details |
|---|---|---|---|---|---|---|---|---|---|
| 1 | 1 |  |  | 5 | 1 | 2022-10-11 16:14:35.030854 | ready |  | [{"snapSize": 1073741824, "snapDiffSize": 10952704} |
| 2 | 2 | 1 |  | 5 | 1 | 2022-10-11 16:22:40.548069 | ready |  | [{"snapSize": 1073741824, "snapDiffSize": 139264} |

| id | asnap_id | destination | metadata | size_data | size_metadata | archived_time |
|---|---|---|---|---|---|---|
| 1 | 1 | sec_dest /sv_2/BASE:80436:D1 | sec_dest /sv_2/BASE:80436:M1 | 10952704 | 2881 | 2022-10-11 16:14:35.062608 |
| 2 | 2 | sec_dest /sv_2/80436:80437:D1 | sec_dest /sv_2/80436:80437:M1 | 139264 | 405 | 2022-10-11 16:22:40.598039 |

| id | metainfo |
|---|---|
| 1 | [{"date": "2022-10-11T10:44:26+0000", "snap": {"cur": "80436", "base": null}, "server": "unityblk", "version": "1.0", "resource": "sv_2", "encryption": []}] |
| 2 | [{"date": "2022-10-11T10:52:33+0000", "snap": {"cur": "80437", "base": "80436"}, "server": "unityblk", "version": "1.0", "resource": "sv_2", "encryption": []}] |

FIG. 10C

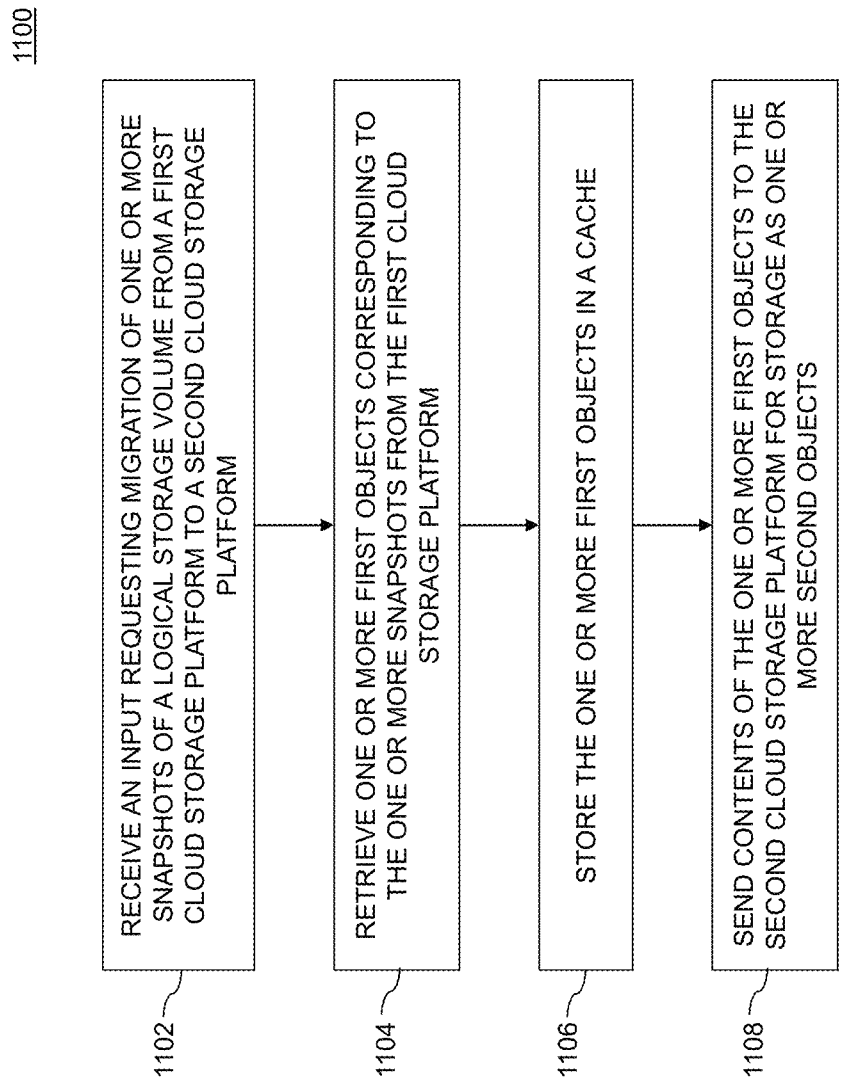

SNAPSHOT MIGRATION BETWEEN CLOUD STORAGE PLATFORMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in information processing systems.

BACKGROUND

In data storage, files that are frequently used and/or critical are generally stored in local storage for fast access. Files that are less frequently used and that do not require the same level of access as the files in local storage can be archived and stored in, for example, low-cost object and cloud storage tiers.

In some cases, snapshots of logical devices from local storage are archived to cloud storage platforms, and the snapshots may be deleted from local storage. If required, the snapshots can be restored back to local storage using a restore task.

SUMMARY

Illustrative embodiments provide techniques for migrating snapshots between cloud storage platforms.

In one embodiment, a method comprises receiving an input requesting migration of one or more snapshots of a logical storage volume from a first cloud storage platform to a second cloud storage platform, and retrieving one or more first objects corresponding to the one or more snapshots from the first cloud storage platform. The one or more first objects are stored in a cache, and contents of the one or more first objects are sent to the second cloud storage platform for storage as one or more second objects.

These and other illustrative embodiments include, without limitation, methods, apparatus, networks, systems and processor-readable storage media.

BRIEF DESCRIPTION OF THE DRAWINGS

FIG. 7A depicts a screenshot of details of data and metadata objects corresponding to a snapshot on the source cloud storage platform according to an illustrative embodiment.

FIG. 7B depicts a screenshot of details of data and metadata objects corresponding to the snapshot on the target cloud storage platform following migration according to an illustrative embodiment.

FIGS. 9A, 9B and 9C illustrate CTA database table entries before migration to a different cloud storage platform according to an illustrative embodiment.

FIGS. 10A, 10B and 10C illustrate CTA database table entries after migration to a different cloud storage platform according to an illustrative embodiment.

FIG. 11 depicts a process for migrating snapshots between cloud storage platforms according to an illustrative embodiment.

DETAILED DESCRIPTION

Figure 1:
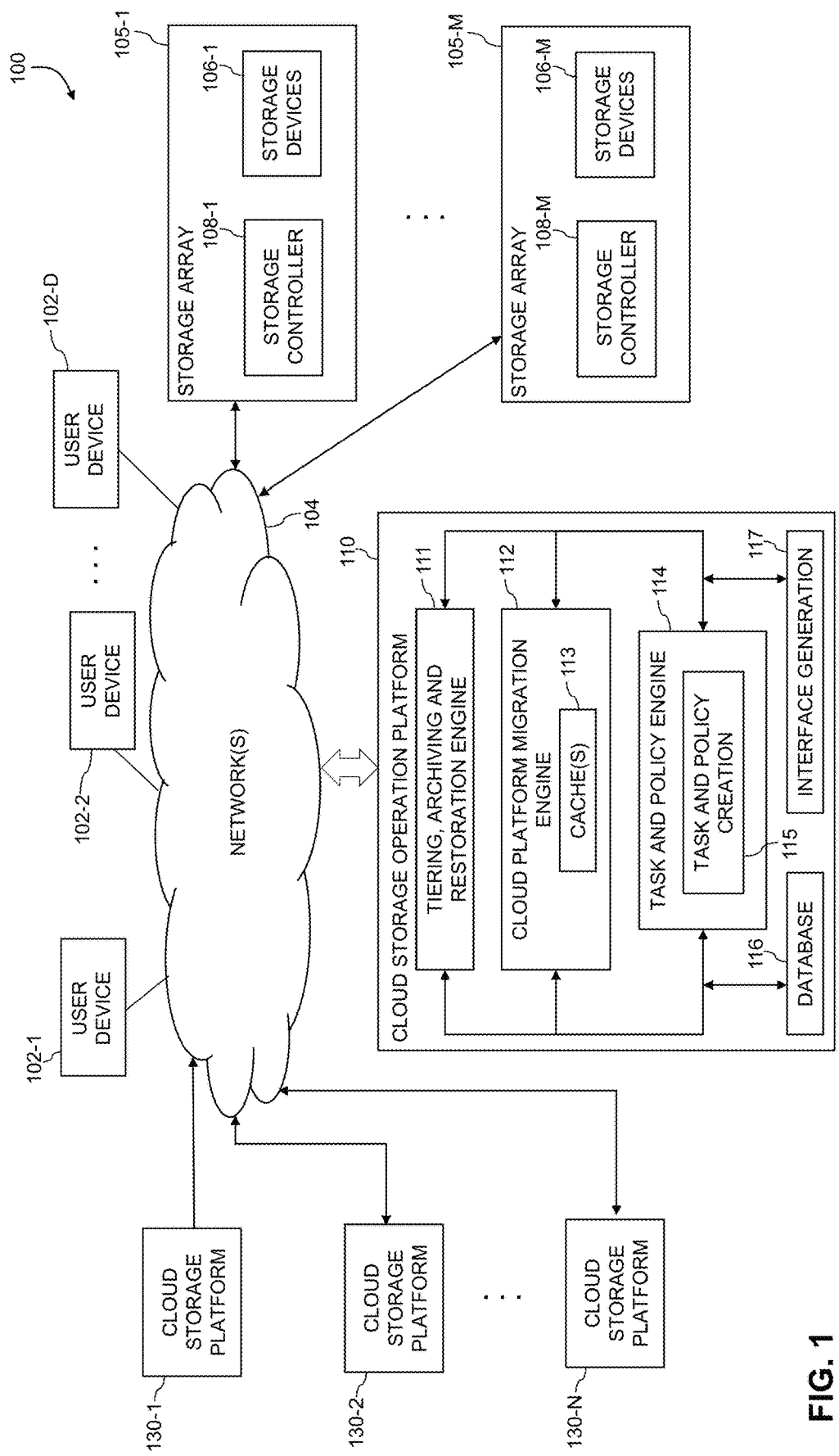
FIG. 1 depicts details of an information processing system with a cloud storage operation platform for migrating snapshots between cloud storage platforms according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, the term "snapshot" is intended to be broadly construed to refer to a point-in-time (PIT) replica of a storage volume (e.g., a logical storage volume identified by, for example a logical unit number (LUN) and/or consistency group (CG)). Multiple snapshots may be generated over time for a given storage volume. As a snapshot is a representation at a particular point in time, a snapshot can include blocks of data at certain points in time. A "base snapshot" can refer to a snapshot at a first point in time (e.g., time t), and a "delta snapshot" can refer to a snapshot at a point in time after the first point in time (e.g., time t+1). In some embodiments, a delta snapshot includes the changes (e.g., changes in the storage volume) from the base snapshot, but not the base snapshot. For example, if files are deleted from and/or added to a storage volume following the generation of the base snapshot, the delta snapshot corresponds only to the deletions and/or additions. Snapshots typically provide data protection so that when information is lost due to some failure event (e.g., corruption of a storage volume), the snapshots provide accessible copies of the data, which allow the data to be restored to a specific point in time if a failure occurs. Snapshots may be stored in chronological order, based on their timestamps.

Illustrative embodiments provide technical solutions to automatically move archived snapshots from one cloud storage platform to another cloud storage platform. Advantageously, a user creates, via a specialized user interface, a snapshot migration task specifying the details of a source cloud provider and a target cloud provider. The task, when executed, migrates the archived snapshots from a source to a target cloud, and provides an option to move archived snapshots from a public to a private cloud.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a cloud storage operation platform 110. A non-limiting example of a cloud storage operation platform 110 comprises a cloud tiering appliance (CTA), but the embodiments are not necessarily limited thereto. The user devices 102 may also communicate over the network 104 with a plurality of storage arrays 105-1, . . . 105-M, collectively referred to herein as storage arrays 105. The storage arrays 105 comprise respective sets of storage devices 106-1, . . . 106-M, collectively referred to herein as storage devices 106, coupled to respective storage controllers 108-1, . . . 108-M, collectively referred to herein as storage controllers 108.

Each of the storage devices 106 may comprise one or more logical volumes, which may comprise one or more logical partitions. As used herein, the term "logical volume" is intended to be broadly construed to refer to an identifiable unit of data storage. For example, a logical volume can refer to a named logical area of a physical disk. A logical volume may also span multiple disks, while appearing as a single, contiguous storage volume in an operating system. Partitions may represent divisions of a logical volume. Logical volumes may be identified by, for example, LUNs and/or CGs. Additionally, logical volumes may be represented by drive designations such as, for example, F: and G: drives.

The user devices 102 can comprise, for example, Internet of Things (IoT) devices, desktop, laptop or tablet computers, mobile telephones, or other types of processing devices capable of communicating with the cloud storage operation platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, M, N and P are assumed to be arbitrary positive integers greater than or equal to one.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the cloud storage operation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cloud storage operation platform 110, as well as to support communication between the cloud storage operation platform 110 and connected devices (e.g., user devices 102) and/or other related systems and devices not explicitly shown.

Users may refer to customers, clients and/or administrators of computing environments for which archiving and migration are being performed. For example, in some embodiments, the user devices 102 are assumed to be associated with repair technicians, system administrators, information technology (IT) managers, software developers release management personnel or other authorized personnel configured to access and utilize the cloud storage operation platform 110.

The cloud storage operation platform 110 of the system 100 is configured to move data between the storage arrays 105 and one or more cloud storage platforms 130-1, 130-2, . . . 130-N, collectively referred to herein as cloud storage platforms 130. The cloud storage operation platform 110 is also configured to move data from one of the cloud storage platforms 130 to another one of the cloud storage platforms 130.

The cloud storage operation platform 110 is configured to move data, for example, by moving data files, snapshots or other data and metadata in and between the user devices 102, the storage arrays 105 and the cloud storage platforms 130. According to one or more embodiments, the cloud storage operation platform 110 is configured to move snapshots between cloud storage platforms 130 based on user-configured tasks. The cloud storage platforms 130 include, for example, Dell® EMC® Elastic Cloud Storage (ECS), Microsoft® Azure®, Amazon® S3, Google® and/or IBM® Cloud Object Storage (COS) platforms, or other available cloud infrastructures.

The cloud storage operation platform 110 in the present embodiment is assumed to be accessible to the user devices 102, and vice-versa, over the network 104. In addition, the cloud storage operation platform 110 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The cloud storage operation platform 110, on behalf of respective infrastructure tenants each corresponding to one or more users associated with respective ones of the user devices 102 provides a platform for managing migration of snapshots between cloud storage platforms. Referring to FIG. 1, the cloud storage operation platform 110 comprises a tiering, archiving and restoration engine 111, a cloud platform migration engine 112, a task and policy engine 114, a database 116 and an interface generation engine 117. The cloud platform migration engine 112 comprises one or more caches 113. The task and policy engine 114 comprises a task and policy creation component 115.

The cloud storage operation platform 110 in some embodiments comprises configurable data mover modules adapted to interact with the user devices 102, the storage arrays 105 and the cloud storage platforms 130. At least one configuration file is implemented in or otherwise associated with the cloud storage operation platform 110. The state of the configuration file may be controlled at least in part by a job scheduler. The job scheduler interacts with the task and policy engine 114. Once an archiving, tiering, restoration and/or a cloud storage platform migration task has been specified by, for example, a user via one of the user devices 102, a task created by the task and policy creation component 115 is sent to a job scheduler, which can be, for example, part of task and policy engine 114, tiering, archiving and restoration engine 111 and/or the cloud platform migration engine 112. Policies and/or constraints specified in the task may be used by the job scheduler as a filter to select files, snapshots and/or corresponding objects which are to be archived, tiered, restored and/or migrated. The job scheduler schedules archiving, file tiering, restoration and/or migration tasks and communicates with the storage arrays 105 and/or cloud storage platforms 130 to retrieve files, snapshots and/or corresponding objects to be archived, tiered, restored or migrated based on the specified policies from the task and policy engine 114. Tasks may start at a scheduled time that can be pre-configured or user-specified via one or more user interfaces.

The cloud storage operation platform 110 can include at least one application programming interface (API) that permits an external component to control selection between various modes of operation. One or more external components can access the configuration file via such an API in order to control a mode of operation of the cloud storage operation platform 110. For example, an application running on one or more of the user devices 102 can access the configuration file via the API in order to control the mode of operation of the cloud storage operation platform 110.

In some embodiments, the cloud storage operation platform 110 is configurable via the configuration file in a mode of operation in which a particular type of data movement in and between user devices 102, the storage arrays 105 and the cloud storage platforms 130 occurs for a given data object being utilized by an application running on one or more of the user devices 102. Furthermore, other embodiments can configure the cloud storage operation platform 110 in different modes of operation without the use of a configuration file. Thus, such a configuration file should not be viewed as a requirement.

The cloud storage operation platform 110 is illustratively coupled to the network 104 and configured to control transfer of data in and between the user devices 102, the storage arrays 105 and the cloud storage platforms 130. The term "data movement" as used in this and other contexts herein is intended to be broadly construed, so as to encompass data migration as well as other types of movement of data and relocation in and between the user devices 102, the storage arrays 105 and the cloud storage platforms 130.

In one or more embodiments, the cloud storage operation platform 110 can be used to tier file data and archive block data to the cloud storage platforms 130, and to recall file data and restore block data to the storage arrays 105 from the cloud storage platforms 130. In some embodiments, the cloud storage operation platform 110 can be used to migrate repositories between cloud storage platforms 130, storage arrays 105 and/or user devices 102.

In, for example, a file tiering process (also referred to herein as "cloud tiering") or file archiving process, the tiering, archiving and restoration engine 111 is configured to identify files that fit an administrator or other user-defined criteria based on one or more policies received from the task and policy engine 114, and initiates movement of the identified files to a cloud storage platform 130. Stub files are created in the original file locations on, for example, the storage array 105 or the user device 102. When stub files are read, the cloud storage operation platform 110 recalls or passes an IO operation through to the original file located in the cloud storage platform 130, and the original file may be presented to a user as if the original file were in its original location on the storage array 105 or user device 102. Stub files comprise information about destinations in the cloud storage platforms 130 where the files corresponding to the stub files are located.

In a block archiving process, the tiering, archiving and restoration engine 111 identifies snapshots (e.g., logical volume snapshots) that fit an administrator or other user-defined criteria based on one or more policies received from the task and policy engine 114 and initiates archiving of the identified snapshots to a cloud storage platform 130, leaving the identified snapshots in the storage arrays 105 or user devices 102. After the identified snapshots are backed up to one or more of the cloud storage platforms 130, the original snapshots can be erased from the storage arrays 105 or user devices 102 to free up space. Users may initiate restoring of one or more snapshots to one or more of the storage arrays 105 or user devices 102 via, for example, a block restore task.

Figure 3:
FIG. 3 depicts a screenshot of details of a logical volume of a storage array for which a snapshot may be taken according to an illustrative embodiment.
Figure 4:
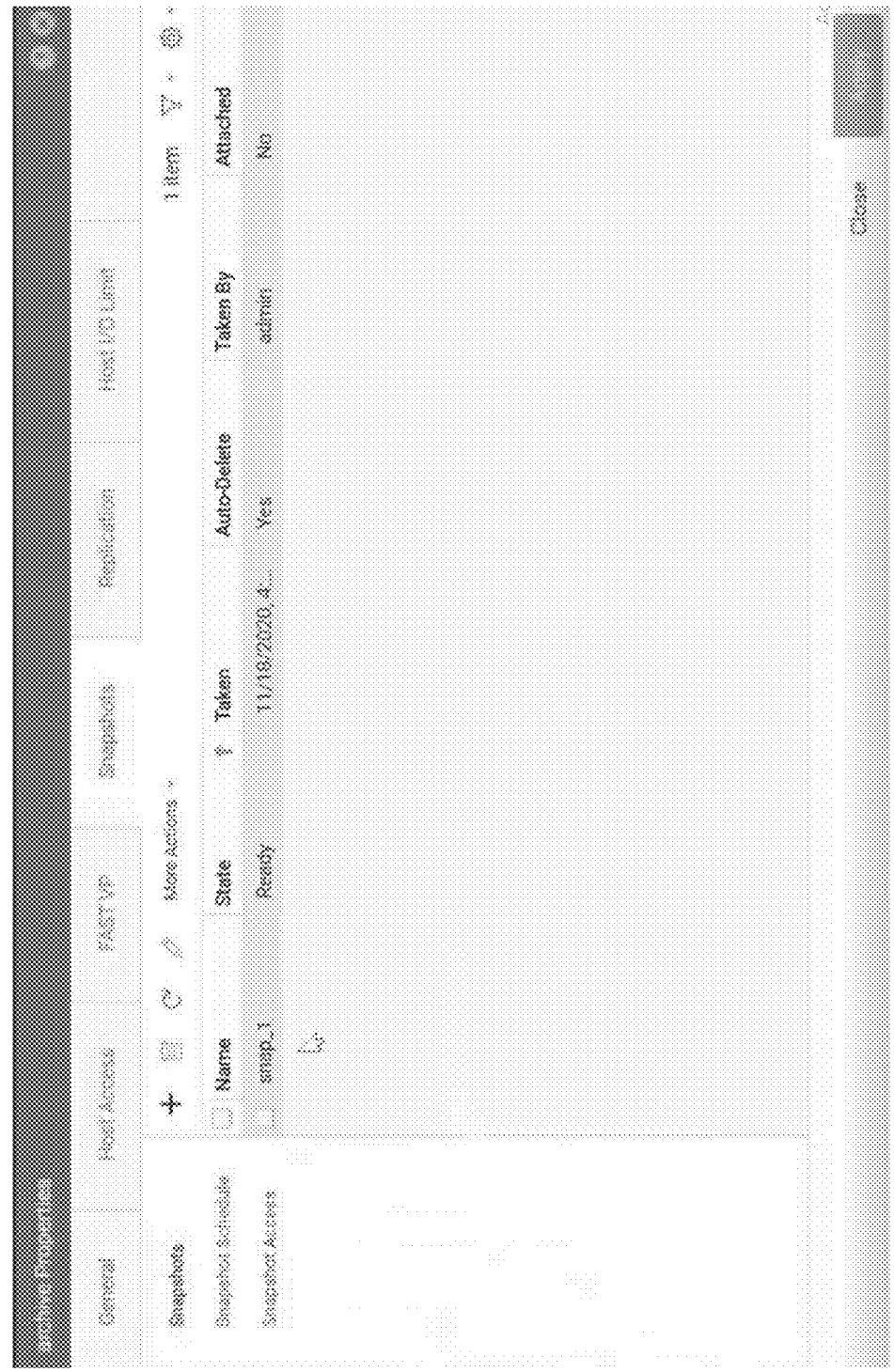
FIG. 4 depicts a screenshot of a user interface on a storage array showing details of a snapshot to be archived according to an illustrative embodiment.

FIG. 3 depicts a screenshot 300 of details of an example logical volume of a storage array (e.g., one of the storage arrays 105) for which a snapshot may be taken. As can be seen in FIG. 3, the logical volume is designated as drive F: and includes four files: File_Test (1).json, File_Test (2).json, File_Test (3).json and File_Test (4).json. Additional details of the files are shown including, modified dates, file type and file size. FIG. 4 depicts a screenshot 400 of a user interface on a storage array (e.g., one of the storage arrays 105) showing details of a snapshot to be archived. The user interface can be generated by the interface generation engine 117 of the cloud storage operation platform 110. In a non-limiting operational example, the snapshot, identified as "snap_1" can be, for example, the snapshot of the logical volume shown in FIG. 3. In connection with the snapshot snap_1, the user interface depicted in the screenshot 400 includes details such as the state (e.g., State), when the snapshot was taken (Taken), whether the snapshot is to be automatically deleted following archiving to the cloud storage platform 130 (Auto-Delete), the entity who took the snapshot (Taken By) and whether the snapshot is attached (Attached). Whether a snapshot is attached refers to whether the snapshot has been locked so that the snapshot cannot be deleted. Once archiving is completed, the snapshot is unlocked. Details such as whether the snapshot should be automatically deleted can be specified by a user during archive task creation.

Figure 5:
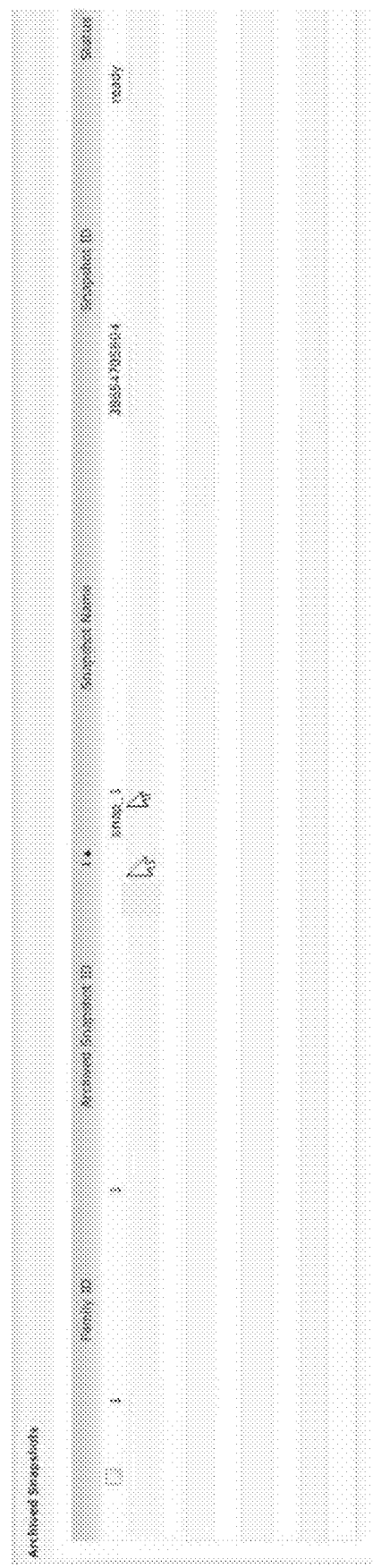
FIG. 5 depicts a screenshot of a user interface on a CTA showing details of the snapshot from FIG. 4 following archiving to a cloud storage platform according to an illustrative embodiment.

FIG. 5 depicts a screenshot 500 of a user interface on a CTA (e.g., cloud storage operation platform 110) showing details of the snapshot from FIG. 4 following archiving to a cloud storage platform 130. Following completion of a snapshot archiving task, the user interface depicted in the screenshot 500 lists the snapshots that have been archived, which in this example is snap 1. The snapshot is assigned a Family identifier (Family ID), archive snapshot identifier (Archive Snapshot ID), a snapshot identifier (Snapshot ID) and is listed with a status (e.g., Ready). The user interface can be generated by the interface generation engine 117 of the cloud storage operation platform 110.

Conventional approaches fail to provide techniques for migrating archived snapshots from one block repository (e.g., first cloud storage platform) to another block repository (e.g., second cloud storage platform). For example, the first and second cloud storage platforms (e.g., two of the cloud storage platforms 130) may be administered by different cloud storage providers. In addition, there are some scenarios where users may migrate snapshots to a public cloud, but after some time want to move their archived snapshots from the public cloud to a private cloud. Current approaches do not allow for migration of archived snapshots from a public cloud to a private cloud.

Figure 2:
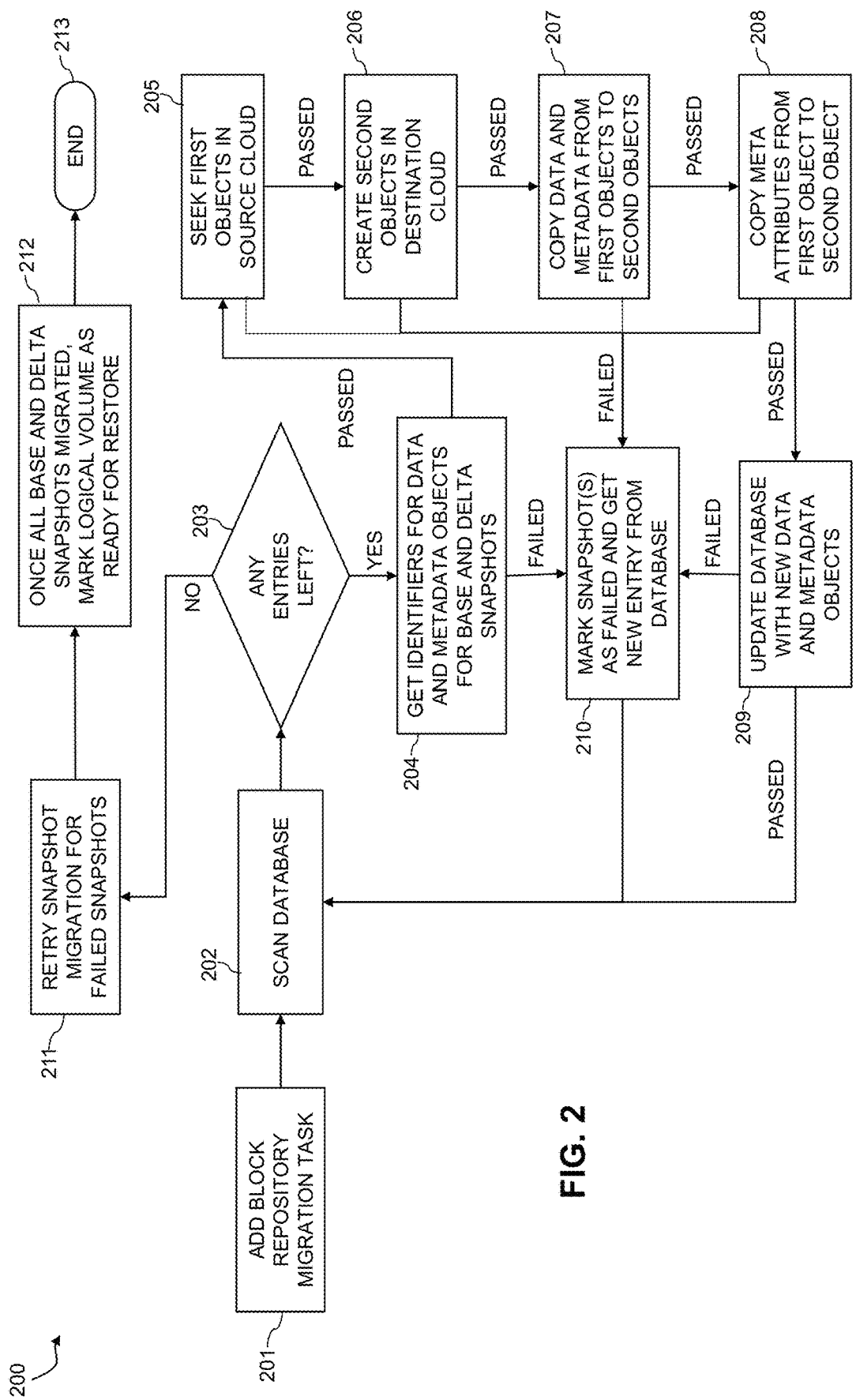
FIG. 2 depicts an operational flow for migrating snapshots between cloud storage platforms according to an illustrative embodiment.

To address the limitations of current approaches, illustrative embodiments provide techniques for migrating archived snapshots from one cloud storage platform to another cloud storage platform. For example, referring to the operational flow 200 in FIG. 2, at block 201, a block repository (cloud storage platform) migration task is added by, for example, a user via a user interface on a CTA. For example, the task may be added via a user interface generated by the interface generation engine 117 of the cloud storage operation platform 110, and may comprise an input requesting migration of one or more snapshots of a logical storage volume from a first cloud storage platform to a second cloud storage platform. The details of the migration task are sent from the task and policy engine 114 to the cloud platform migration engine 112. Details can be inputted via the user interface and may specify, for example, the snapshot(s) (e.g., snap 1) to be migrated, the corresponding logical volume identifier, the source cloud storage platform and/or the destination cloud storage platform. Depending on the scenario, snapshots can be identified according to, for example, snapshot name, snapshot ID, archived snapshot ID, family ID, date taken, entity that took the snapshot, the logical volume that is the subject of the snapshot or other factors.

Referring to block 202, for the identified snapshots, the cloud platform migration engine 112 scans the database 116 associated with or on the cloud storage operation platform 110 to find data and metadata corresponding to all base and delta snapshots for a particular logical volume that have been archived in a source cloud storage platform. For example, in illustrative embodiments, when a snapshot is archived to a cloud platform, one or more entries in the database 116 are created which will have information such as, but not necessarily limited to, cloud storage platform identifying information (e.g., unique identifiers, uniform resource locators (URLs), data object and metadata object details (e.g., object identifiers (OIDs)), archive time and metadata information.

FIGS. 9A, 9B and 9C depict tables 901, 902 and 903 that may be stored in a CTA database (e.g., database 116) prior to snapshot migration to a different cloud storage platform. In a non-limiting operational example, the tables 901, 902 and 903 include details for a base and a delta snapshot. The illustrated entries for the table 901 in FIG. 9A include, but are not necessarily limited to, an overall identifier (id), a snapshot identifier (snap_id), a base identifier (base_id) if the snapshot is a delta snapshot and references a base snapshot, a parent identifier (parent id) identifying the first snapshot taken on a volume, a destination type (dest_type) and destination identifier (dest_id) identifying the cloud storage platform where the snapshot is archived. Further entries include, for example, details of when the snapshots were archived (archived_time) including date and time, a snapshot status, sizes (e.g., bytes, KB, MB, GB, etc.) of the snapshots ("snapSize") and sizes of any delta snapshots related to a given snapshot ("snapDiffSize").

The entries for the table 902 in FIG. 9B include, but are not necessarily limited to, an overall identifier (id), an archived snapshot identifier (asnap_id), a location (e.g., bucket name) for a data object associated with a cloud storage platform 130 corresponding to an archived snapshot (e.g., first_dest/sv2/) including an object identifier for the data object (e.g., BASE:80436:D1) corresponding to the archived snapshot, and a location (e.g., bucket name) for a metadata object associated with the cloud storage platform 130 corresponding to the archived snapshot (first_dest/sv2/) including an object identifier for the metadata object (BASE: 80436:M1) corresponding to the archived snapshot. In connection with the second snapshot on table 902, which is a delta snapshot, the data and metadata object identifiers identify the base snapshot (80436) and the delta snapshot (80437). The table 902 further includes entries for the data size, metadata size and the archived time. Table 903 is a continuation of table 902 and is listed as a separate table due to space constraints. Table 903 includes entries for additional metadata (metainfo) for each snapshot. The additional metadata includes, but is not necessarily limited to, time and date snapshot was taken, the snapshot id, whether the snapshot corresponds to a base, a server name for a server from which the snapshot was taken, operating system versions, the cloud platform name on which the snapshot was archived and encryption information (e.g., whether the snapshot was encrypted, protocols used, etc.,).

Referring back to the operational flow 200, at blocks 202 and 203, the database (e.g., database 116) is scanned for entries (e.g., like entries in tables 901, 902 and 903) to find data and metadata corresponding to all base and delta snapshots for a particular logical volume that have been archived in a source cloud storage platform (one of cloud storage platforms 130). At block 203, if there are entries that have not been addressed, the operational flow proceeds to block 204, where identifiers for data and metadata objects for base and delta snapshots are obtained. For example, the database 116 is queried for object identifiers corresponding to data and metadata objects for the base and delta snapshots. If the operation is unsuccessful at block 204 (failed), the operational flow 200 proceeds to block 210 where the snapshots for which identifiers were not able to be obtained are flagged as failed, and the operational flow 200 returns to block 202 where the database is scanned again for additional entries to find data and metadata corresponding to all base and delta snapshots for a particular logical volume that have been archived in a source cloud storage platform. If the operation is successful at block 204 (passed), the operational flow 200 proceeds to block 205, where the data and metadata objects for the base and delta snapshots corresponding to obtained identifiers are searched for in the source cloud storage platform. If found, the data and metadata objects (referred to as "first objects") are read and downloaded by the cloud platform migration engine 112 to the cache 113. The operational flow 200 then proceeds to block 206, where new data and metadata objects for the base and delta snapshots (referred to as "second objects") are created in a destination cloud storage platform (another one of the cloud storage platforms 130). Then at block 207, the data and metadata from the first objects downloaded to the cache 113 are uploaded to the newly created second objects in the destination cloud storage platform. In addition, at block 208, any other metadata from and/or associated with the first objects is copied to the second objects. This additional metadata is also downloaded to the cache 113 and uploaded to the newly created second objects in the destination cloud storage platform. The additional metadata includes, for example, the data size, metadata size and the archived time, as well as one or more of the entries associated with the "metainfo" in table 903.

Then, at block 209, the cloud platform migration engine 112 updates the database 116 with data corresponding to the new (e.g., second) data and metadata objects created in the destination cloud storage platform, including new object identifiers (OIDs) associated with the new data and metadata objects. In more detail, FIGS. 10A, 10B and 10C depict tables 1001, 1002 and 1003 that may be stored in a CTA database (e.g., database 116) following snapshot migration to the destination cloud storage platform. Similar to tables 901, 902 and 903, the tables 1001, 1002 and 1003 include details for the same base and delta snapshots. The table 1001 is the same as table 901, except that table 1001 specifies a destination type (dest_type) identifying the destination cloud storage platform to where the snapshots have been migrated. For example, in table 901, "4" refers to a first cloud server (e.g., Amazon® S3 cloud server) on which snapshots were residing before migration, and "5" refers to a second cloud server (e.g., Microsoft® Azure®) to which the snapshots have been migrated. The previous details of when the snapshots were first archived (archived_time), snapshot status, sizes of the snapshots ("snapSize") and sizes of any delta snapshots related to a given snapshot ("snapDiffSize") are the same.

The entries for the table 1002 in FIG. 10B are similar to those in FIG. 9B, but identify a different location (e.g., bucket name) for the data and metadata objects associated with the cloud storage platform 130 corresponding to destination cloud storage platform (e.g., sec dest/sv2/) and include object identifiers for the data object (e.g., BASE:80436:D1) and the metadata object (BASE:80436:M1) corresponding to the archived snapshot. In connection with the second snapshot on table 1002, which is a delta snapshot, the data and metadata object identifiers identify the base snapshot (80436) and the delta snapshot (80437). Like table 902, table 1002 further includes entries for the data size, metadata size and the original archived time. Table 1003 is a continuation of table 1002 and is listed as a separate table due to space constraints. Table 1003 includes the same entries as table 903.

If any of the operations in blocks 205-209 fail ((i) first objects could not be found in the source cloud storage platform; (ii) second objects could not be created in the destination cloud storage platform; (iii) data and metadata could not be copied to the created second objects; (iv) additional metadata could not be copied to the created second objects; or (v) the database 116 could not be updated with the new data and metadata objects), the operational flow 200 proceeds to block 210. At block 210, the corresponding snapshots for which the operations in blocks 205-209 failed, are flagged as failed, and the operational flow 200 returns to block 202 where the database is scanned again for additional entries to find data and metadata corresponding to all base and delta snapshots for a particular logical volume that have been archived in a source cloud storage platform. At block 203, if there are no entries left in the database that have not been analyzed, the operational flow 200 proceeds to block 211, where the snapshot migration task is retried for any of the snapshots that have been flagged as failed. In this case the process returns to block 202. At block 212, once all base and delta snapshots for the block repository task have been migrated, a logical volume corresponding to the migrated snapshots is flagged by the tiering, archiving and restoration engine 111 as ready to be restored to a new logical volume in one or more of the storage arrays 105 or other device. For example, the cloud platform migration engine 112 makes a determination whether the contents of all objects from a source cloud storage platform corresponding to all base and delta snapshots for the block repository task have been sent to the second cloud storage platform. Responsive to an affirmative determination, the snapshots are flagged as ready to restore from the destination cloud storage platform. The operational flow 200 is then ended at block 213.

Figure 6:
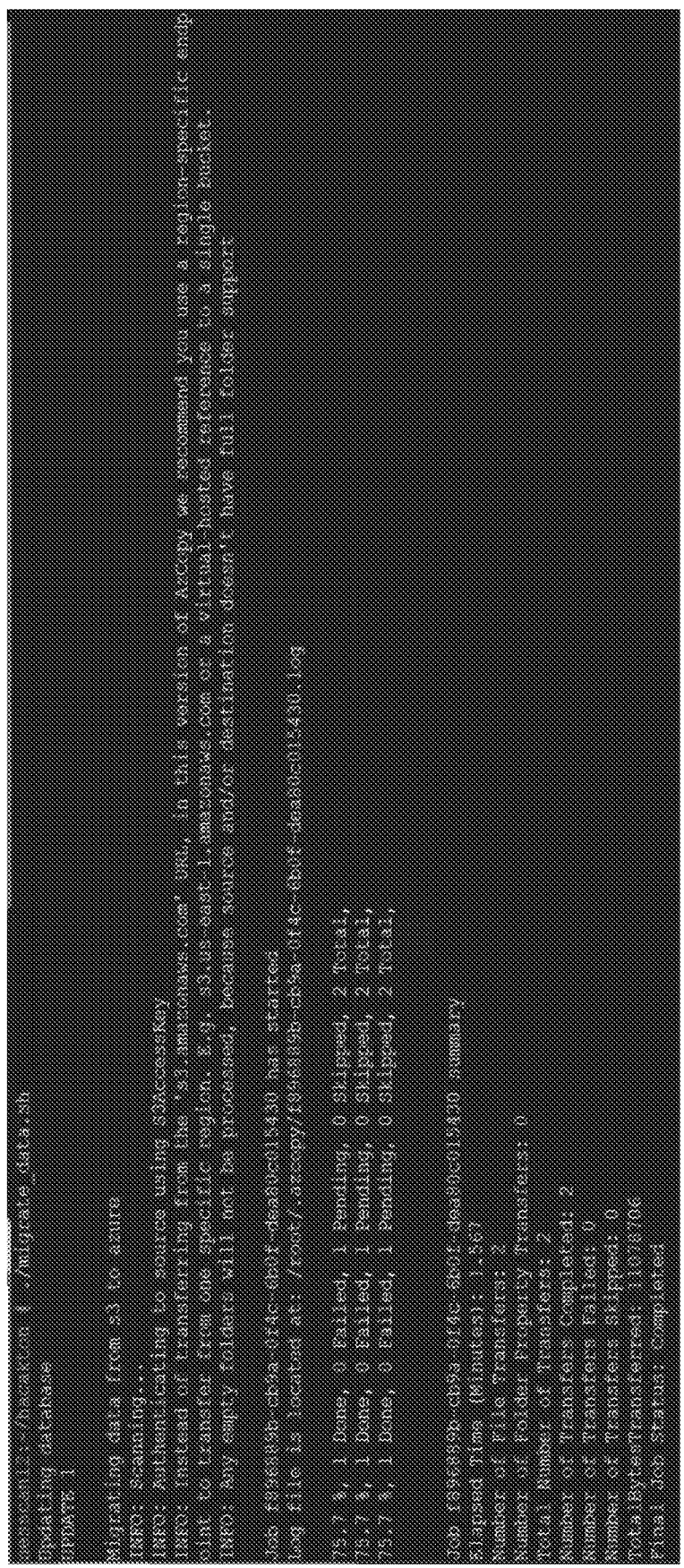
FIG. 6 depicts a screenshot showing details of a snapshot migration task from a source cloud storage platform to a target cloud storage platform according to an illustrative embodiment.

FIG. 6 depicts a screenshot 600 showing details of a snapshot migration task from a source cloud storage platform (e.g., Amazon® S3) to a target cloud storage platform (e.g., Microsoft® Azure®). In this example, two objects are transferred totaling 11,078,706 bytes.

Figures 7A, 7B:
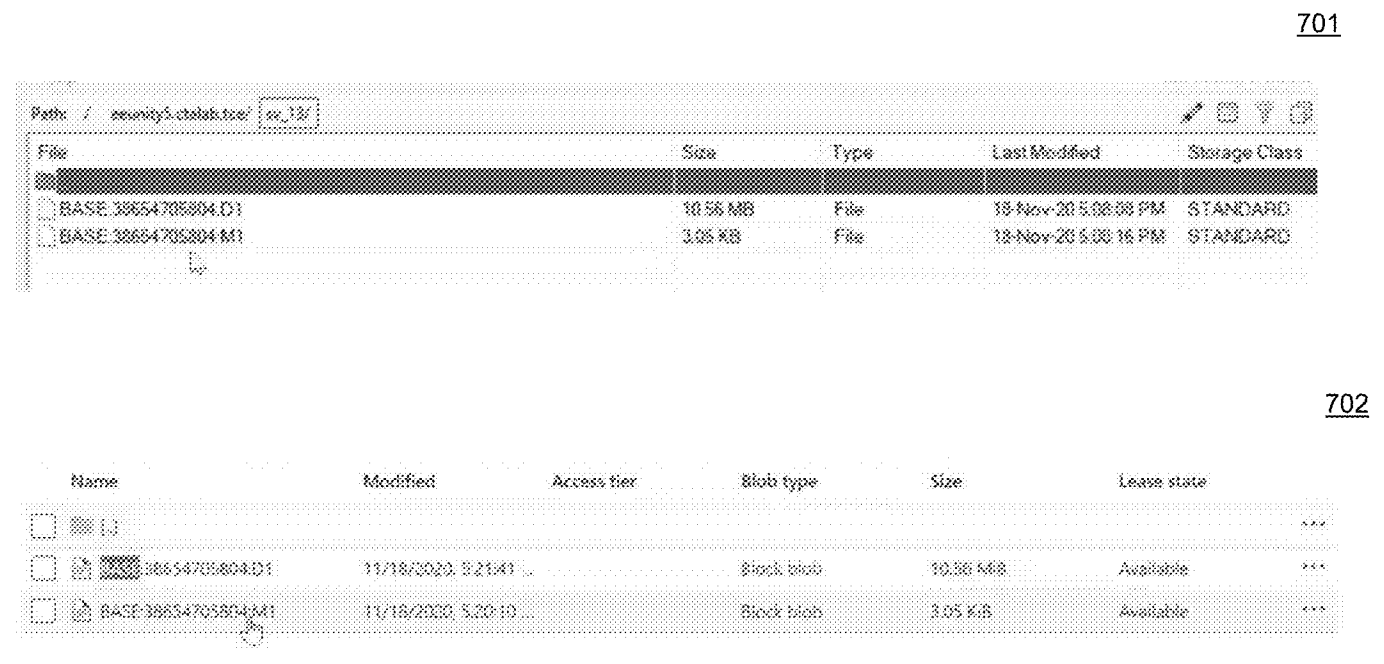

FIG. 7A depicts a screenshot 701 of details of a data object (BASE:38654705804:D1) and a metadata object (BASE:38654705804:M1) corresponding to a snapshot on a source cloud storage platform, and FIG. 7B depicts a screenshot 702 of details of the same data and metadata objects corresponding to the snapshot on a target cloud storage platform following migration. As can be seen, the size is the same on both screenshots 701 and 702. The modified time differs (e.g., is later in the screenshot 702) to account for when the migration occurred.

Figure 8A:
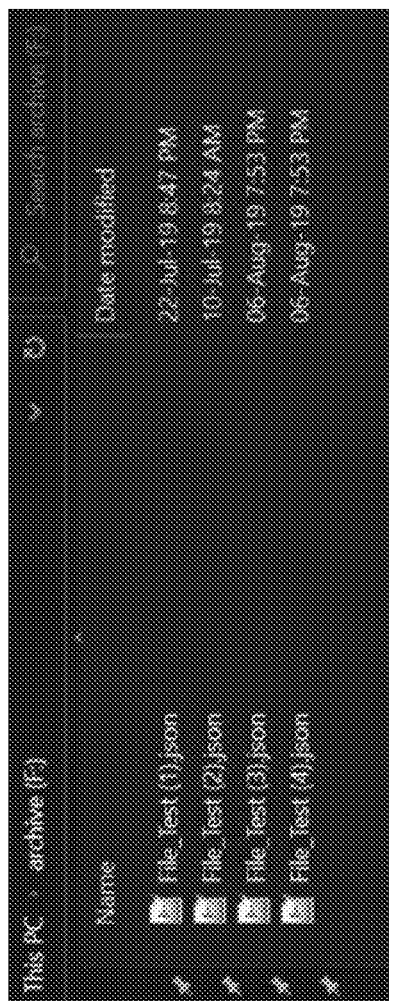
FIG. 8A depicts a screenshot of details of files on a logical device of a storage array prior to archiving and snapshot migration according to an illustrative embodiment.
Figure 8B:
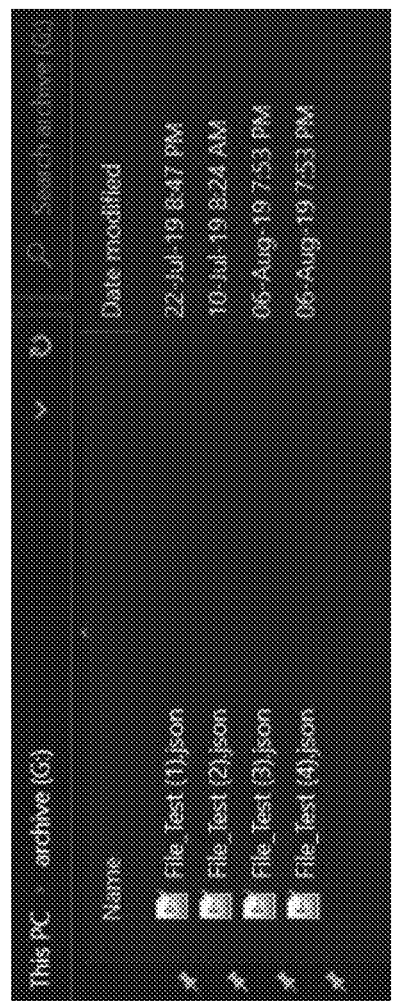
FIG. 8B depicts a screenshot of details of the files on a different logical device of the storage array following archiving, snapshot migration and restoration according to an illustrative embodiment.

FIG. 8A depicts a screenshot 801 of details of files (e.g., File_Test (1).json, File_Test (2).json, File_Test (3).json and File_Test (4).json) in a logical volume (F:) of a storage array 105 prior to archiving and migration of a snapshot of the logical volume. FIG. 8B depicts a screenshot 802 of details of the same files on a different logical volume (G:) of the storage array 105 following archiving of the snapshot to first cloud storage platform, snapshot migration to a second cloud storage platform and restoration of the snapshot from the second cloud storage platform. As can be seen, the file details are the same in the screenshots 801 and 802, showing the snapshot taken of logical volume F: was successfully archived, migrated from one cloud storage platform 130 to another cloud storage platform 130 and restored to logical volume G: of a storage array 105. In one or more embodiments, the cloud storage operation platform 110, and more particularly, the tiering, archiving, and restoration engine 111 is configured to execute a task to restore the migrated snapshots from a destination cloud storage platform 130 to a storage array 105. The restoration task can be introduced via a user interface generated by the interface generation engine 117, and processed by the task and policy engine 114 prior to implementation by the tiering, archiving and restoration engine 111. The task may specify, for example, the snapshots to be restored, the corresponding logical volume, and the current archived location of the snapshots.

According to one or more embodiments, the database 116 used herein can be configured according to a relational database management system (RDBMS) (e.g., PostgreSQL). The database 116 in some embodiments is implemented using one or more storage systems or devices associated with the cloud storage operation platform 110. In some embodiments, one or more of the storage systems utilized to implement the databases comprise a scale-out all-flash content addressable storage array or other type of storage array. Similarly, the storage arrays 105 described herein may comprise scale-out all-flash content addressable storage arrays or other type of storage arrays.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cloud storage operation platform 110, the tiering, archiving and restoration engine 111, the cloud platform migration engine 112, the task and policy engine 114, the database 116 and the interface generation engine 117 in other embodiments can be implemented at least in part externally to the cloud storage operation platform 110, for example, as stand-alone servers, sets of servers or other types of systems coupled to the network 104. For example, the tiering, archiving and restoration engine 111, the cloud platform migration engine 112, the task and policy engine 114, the database 116 and the interface generation engine 117 may be provided as cloud services accessible by the cloud storage operation platform 110.

The tiering, archiving and restoration engine 111, the cloud platform migration engine 112, the task and policy engine 114, the database 116 and the interface generation engine 117 in the FIG. 1 embodiment are each assumed to be implemented using at least one processing device. Each such processing device generally comprises at least one processor and an associated memory, and implements one or more functional modules for controlling certain features of the tiering, archiving and restoration engine 111, the cloud platform migration engine 112, the task and policy engine 114, the database 116 and/or the interface generation engine 117.

At least portions of the cloud storage operation platform 110 and the components thereof may be implemented at least in part in the form of software that is stored in memory and executed by a processor. The cloud storage operation platform 110 and the components thereof comprise further hardware and software required for running the cloud storage operation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the tiering, archiving and restoration engine 111, the cloud platform migration engine 112, the task and policy engine 114, the database 116, the interface generation engine 117 and other components of the cloud storage operation platform 110 in the present embodiment are shown as part of the cloud storage operation platform 110, at least a portion of the tiering, archiving and restoration engine 111, the cloud platform migration engine 112, the task and policy engine 114, the database 116, the interface generation engine 117 and other components of the cloud storage operation platform 110 in other embodiments may be implemented on one or more other processing platforms that are accessible to the cloud storage operation platform 110 over one or more networks. Such components can each be implemented at least in part within another system element or at least in part utilizing one or more stand-alone components coupled to the network 104.

It is assumed that the cloud storage operation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the tiering, archiving and restoration engine 111, the cloud platform migration engine 112, the task and policy engine 114, the database 116, the interface generation engine 117 and other components of the cloud storage operation platform 110, and the elements thereof can each be implemented in the form of one or more LXCs running on one or more VMs. Other arrangements of one or more processing devices of a processing platform can be used to implement the tiering, archiving and restoration engine 111, the cloud platform migration engine 112, the task and policy engine 114, the database 116 and the interface generation engine 117 as well as other components of the cloud storage operation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the cloud storage operation platform 110 to reside in different data centers. Numerous other distributed implementations of the cloud storage operation platform 110 are possible.

Accordingly, one or each of the tiering, archiving and restoration engine 111, the cloud platform migration engine 112, the task and policy engine 114, the database 116, the interface generation engine 117 and other components of the cloud storage operation platform 110 can each be implemented in a distributed manner so as to comprise a plurality of distributed components implemented on respective ones of a plurality of compute nodes of the cloud storage operation platform 110.

It is to be appreciated that these and other features of illustrative embodiments are presented by way of example only, and should not be construed as limiting in any way.

Accordingly, different numbers, types and arrangements of system components such as the tiering, archiving and restoration engine 111, the cloud platform migration engine 112, the task and policy engine 114, the database 116, the interface generation engine 117 and other components of the cloud storage operation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the cloud storage operation platform can be offered to cloud infrastructure customers or other users as part of FaaS, CaaS and/or PaaS offerings.

The operation of the information processing system 100 will now be described in further detail with reference to the flow diagram of FIG. 11. With reference to FIG. 11, a process 1100 for migrating snapshots between cloud storage platforms as shown includes steps 1102 through 1108, and is suitable for use in the system 100 but is more generally applicable to other types of information processing systems comprising a cloud storage operation platform configured for migrating snapshots between cloud storage platforms.

In step 1102, an input requesting migration of one or more snapshots of a logical storage volume from a first cloud storage platform to a second cloud storage platform is received. The one or more snapshots comprise at least one of one or more base snapshots and one or more delta snapshots.

In step 1104, one or more first objects corresponding to the one or more snapshots from are retrieved the first cloud storage platform. In step 1106, the one or more first objects are stored in a cache. In step 1108, contents of the one or more first objects are sent to the second cloud storage platform for storage as one or more second objects. The contents of the one or more first objects comprise data and metadata corresponding to the one or more snapshots. The first and second objects each comprise at least one data object and at least one metadata object. One or more entries are created in a database of a cloud storage operation platform (e.g., CTA) for one or more object identifiers corresponding to the one or more first objects, and one or more additional entries are created in the database for one or more additional object identifiers corresponding to the one or more second objects. The one or more entries are associated with the first cloud storage platform and the one or more additional entries are associated with the second cloud storage platform.

In illustrative embodiments, a determination is made whether contents of all objects from the first cloud storage platform corresponding to the one or more snapshots have been sent to the second cloud storage platform. Responsive to an affirmative determination, the one or more snapshots are flagged as ready to restore from the second cloud storage platform. In one or more embodiments, a task is executed to restore the one or more snapshots from the second cloud storage platform to a storage array.

In retrieving the one or more first objects corresponding to the one or more snapshots from the first cloud storage platform a database is queried for one or more object identifiers corresponding to the one or more first objects. The one or more first objects are retrieved from the first cloud storage platform based, at least in part, on the one or more object identifiers. In response to sending the contents of the one or more first objects to the second cloud storage platform, the database is updated with one or more additional object identifiers corresponding to the one or more second objects. In illustrative embodiments, the one or more second objects are created on the second cloud storage platform In the process, an interface is generated for a user to request the migration of the one or more snapshots from the first cloud storage platform to the second cloud storage platform. In some embodiments, the first cloud storage platform comprises a public cloud platform and the second cloud storage platform comprises a private cloud storage platform. Alternatively, the first and second cloud storage platforms comprise public cloud storage platforms.

It is to be appreciated that the FIG. 11 process and other features and functionality described above can be adapted for use with other types of information systems configured to execute snapshot migration services in a cloud storage operation platform or other type of platform.

The particular processing operations and other system functionality described in conjunction with the flow diagram of FIG. 11 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 11 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cloud storage operation platform as disclosed herein can provide a number of significant advantages relative to conventional arrangements. For example, unlike conventional techniques, the embodiments advantageously enable users to utilize a CTA or other migration appliance to migrate snapshots between cloud storage platforms. Advantageously, users can input a block repository migration task via a user interface to a CTA. The CTA scans a database to find all the data and metadata corresponding to all base and delta snapshots for a logical storage volume (e.g., LUN or CG) archived in a source cloud storage platform. For example, when snapshots are archived to a cloud platform, the embodiments advantageously create entries in a database of a cloud storage operation platform which will have information like cloud storage platform information, data object details, metadata object details, archive time and metadata information.

The data and metadata corresponding to the base and delta snapshots for the logical storage volume are copied (e.g., uploaded) to a destination cloud as new objects. After successful uploading of the data and metadata objects to the destination cloud, the database is updated with new data and metadata corresponding to the newly migrated snapshots and the destination cloud storage platform. Advantageously, if a user wants to restore one or more snapshots to, for example, a storage array from the destination cloud storage platform, the CTA will read the data and metadata from the destination cloud storage platform.

Conventional software in, for example, a CTA, is not configured for migrating archived snapshots from one block repository (first cloud storage platform) to another block repository (second cloud storage platform). Due to compression and encryption issues with archived snapshots, the current approaches encounter difficulties due to, for example, the extended times that are required to reverse engineer the compression and encryption protocols associated with the archived snapshots and to re-archive the snapshots to a target cloud storage platform.

To address these limitations of current approaches, illustrative embodiments provide technical solutions to automatically move archived snapshots from one cloud storage platform to another cloud storage platform without requiring manual intervention. Advantageously, a user created task, when executed, migrates the archived snapshots from a source to a target cloud, and provides an option to move archived snapshots from a public to a private cloud.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the cloud storage operation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cloud storage operation platform in illustrative embodiments. These and other cloud-based systems in illustrative embodiments can include object stores.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
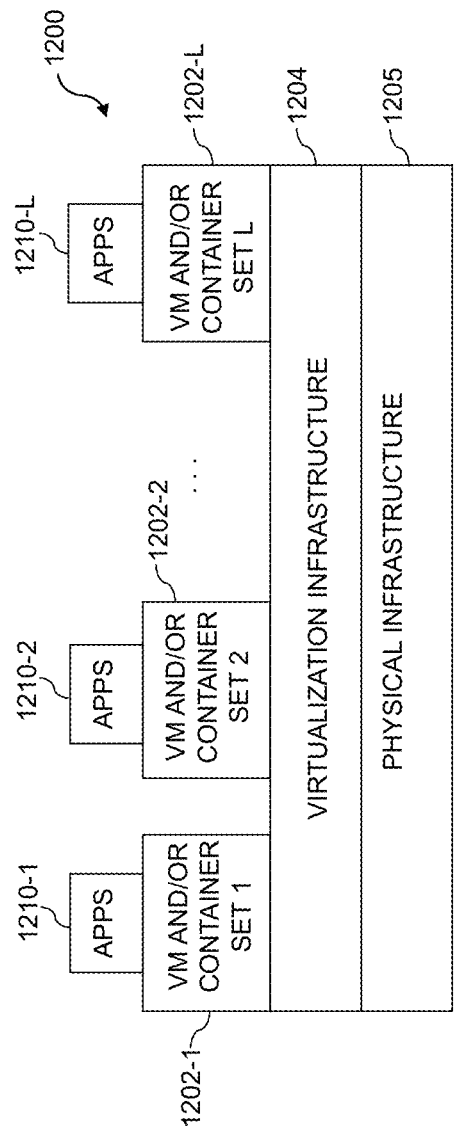
FIGS. 12 and 13 show examples of processing platforms that may be utilized to implement at least a portion of an information processing system according to illustrative embodiments.
Figure 13:
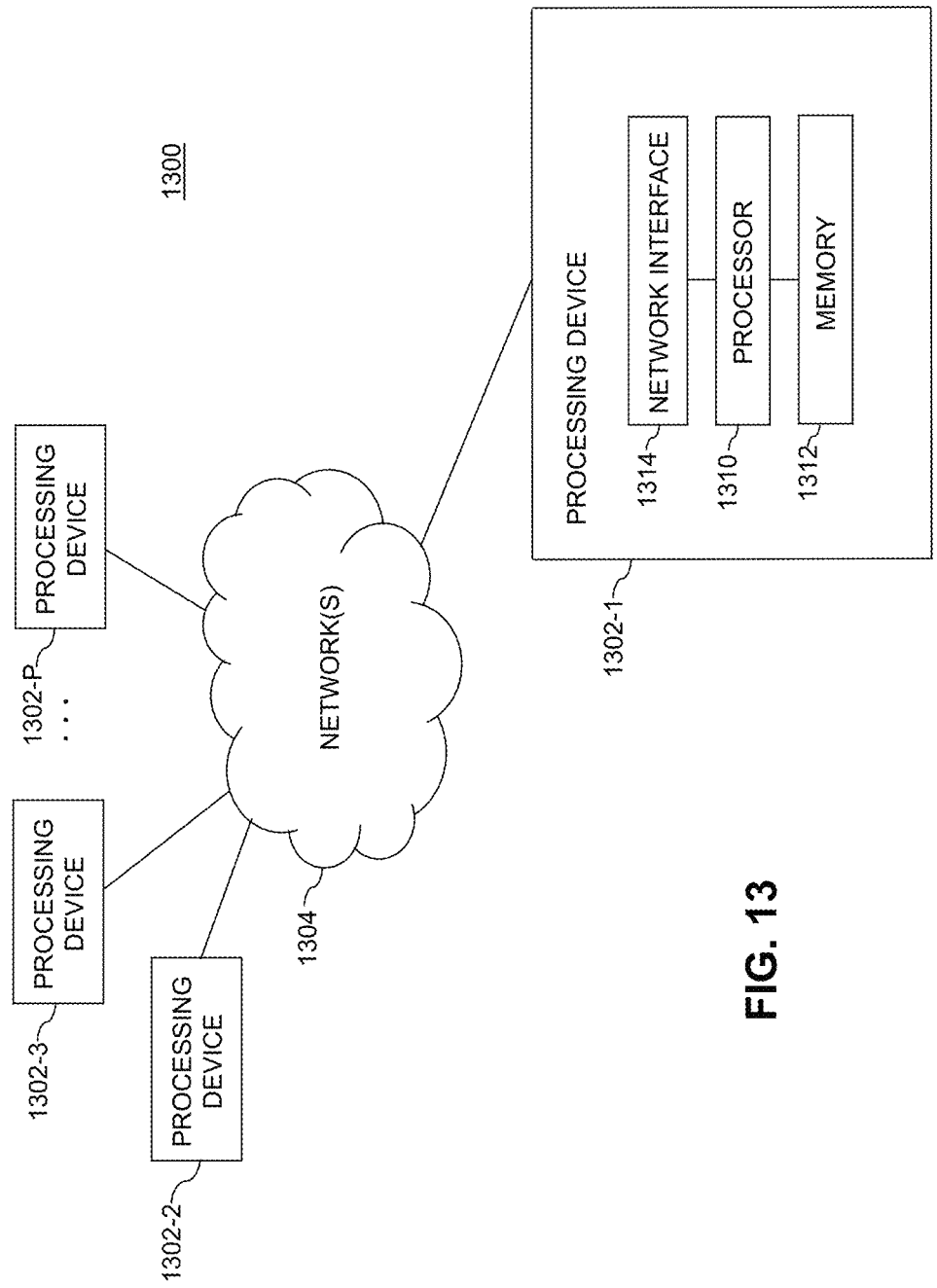

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure

1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-P, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312. The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the cloud storage operation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cloud storage operation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured:
   to receive an input requesting migration of one or more snapshots of a logical storage volume from a first cloud storage platform to a second cloud storage platform;
   to retrieve one or more first objects corresponding to the one or more snapshots from the first cloud storage platform;
   to store the one or more first objects in a cache;
   to send contents of the one or more first objects to the second cloud storage platform for storage as one or more second objects;

to create one or more entries in a database for one or more object identifiers corresponding to the one or more first objects; and to create one or more additional entries in the database for one or more additional object identifiers corresponding to the one or more second objects;

wherein, in creating the one or more additional entries in the database, said at least one processing platform is configured to replace one or more destination identifiers indicating the first cloud storage platform with one or more destination identifiers indicating the second cloud storage platform.

2. The apparatus of claim 1 wherein the one or more snapshots comprise at least one of one or more base snapshots and one or more delta snapshots.

3. The apparatus of claim 1 wherein the one or more first objects comprise at least one data object and at least one metadata object, and wherein the contents of the one or more first objects comprise data and metadata corresponding to the one or more snapshots.

4. The apparatus of claim 1 wherein said at least one processing platform is further configured:
to determine whether contents of all objects from the first cloud storage platform corresponding to the one or more snapshots have been sent to the second cloud storage platform; and
to flag the one or more snapshots as ready to restore from the second cloud storage platform responsive to an affirmative determination.

5. The apparatus of claim 1 wherein said at least one processing platform is further configured to execute a task to restore the one or more snapshots from the second cloud storage platform to a storage array.

6. The apparatus of claim 1 wherein, in retrieving the one or more first objects corresponding to the one or more snapshots from the first cloud storage platform, said at least one processing platform is configured:
to query the database for the one or more object identifiers corresponding to the one or more first objects; and
to retrieve the one or more first objects from the first cloud storage platform based, at least in part, on the one or more object identifiers.

7. The apparatus of claim 6 wherein, in response to sending the contents of the one or more first objects to the second cloud storage platform, said at least one processing platform is configured to update the database with the one or more additional object identifiers corresponding to the one or more second objects.

8. The apparatus of claim 1 wherein the one or more entries are associated with the first cloud storage platform and the one or more additional entries are associated with the second cloud storage platform.

9. The apparatus of claim 1 wherein said at least one processing platform is further configured to create the one or more second objects on the second cloud storage platform.

10. The apparatus of claim 1 wherein said at least one processing platform is further configured to generate an interface for a user to request the migration of the one or more snapshots from the first cloud storage platform to the second cloud storage platform.

11. The apparatus of claim 1 wherein the first cloud storage platform comprises a public cloud storage platform and the second cloud storage platform comprises a private cloud storage platform.

12. The apparatus of claim 1 wherein said at least one processing platform comprises a cloud tiering appliance.

13. A method comprising:
receiving an input requesting migration of one or more snapshots of a logical storage volume from a first cloud storage platform to a second cloud storage platform;
retrieving one or more first objects corresponding to the one or more snapshots from the first cloud storage platform;
storing the one or more first objects in a cache;
sending contents of the one or more first objects to the second cloud storage platform for storage as one or more second objects;
creating one or more entries in a database for one or more object identifiers corresponding to the one or more first objects; and
creating one or more additional entries in the database for one or more additional object identifiers corresponding to the one or more second objects;
wherein creating the one or more additional entries in the database comprises replacing one or more destination identifiers indicating the first cloud storage platform with one or more destination identifiers indicating the second cloud storage platform; and
wherein the method is performed by at least one processing platform comprising a processor coupled to a memory.

14. The method of claim 13 wherein retrieving the one or more first objects corresponding to the one or more snapshots from the first cloud storage platform comprises:
querying the database for the one or more object identifiers corresponding to the one or more first objects; and
retrieving the one or more first objects from the first cloud storage platform based, at least in part, on the one or more object identifiers.

15. The method of claim 14 wherein, in response to sending the contents of the one or more first objects to the second cloud storage platform, the method further comprises updating the database with the one or more additional object identifiers corresponding to the one or more second objects.

16. The method of claim 13 wherein the one or more snapshots comprise at least one of one or more base snapshots and one or more delta snapshots.

17. A computer program product comprising a non-transitory processor-readable storage medium having stored therein program code of one or more software programs, wherein the program code when executed by at least one processing platform causes the at least one processing platform:
to receive an input requesting migration of one or more snapshots of a logical storage volume from a first cloud storage platform to a second cloud storage platform;
to retrieve one or more first objects corresponding to the one or more snapshots from the first cloud storage platform;
to store the one or more first objects in a cache;
to send contents of the one or more first objects to the second cloud storage platform for storage as one or more second objects;
to create one or more entries in a database for one or more object identifiers corresponding to the one or more first objects; and
to create one or more additional entries in the database for one or more additional object identifiers corresponding to the one or more second objects;
wherein, in creating the one or more additional entries in the database, said at least one processing platform is configured to replace one or more destination identifiers indicating the first cloud storage platform with one or more destination identifiers indicating the second cloud storage platform.

18. The computer program product according to claim 17 wherein, in retrieving the one or more first objects corresponding to the one or more snapshots from the first cloud storage platform, the program code causes the at least one processing platform:
   to query the database for the one or more object identifiers corresponding to the one or more first objects; and
   to retrieve the one or more first objects from the first cloud storage platform based, at least in part, on the one or more object identifiers.

19. The computer program product according to claim 18 wherein, in response to sending the contents of the one or more first objects to the second cloud storage platform, the program code causes the at least one processing platform to update the database with the one or more additional object identifiers corresponding to the one or more second objects.

20. The computer program product according to claim 17 wherein the one or more snapshots comprise at least one of one or more base snapshots and one or more delta snapshots.

* * * * *